Figure 1:
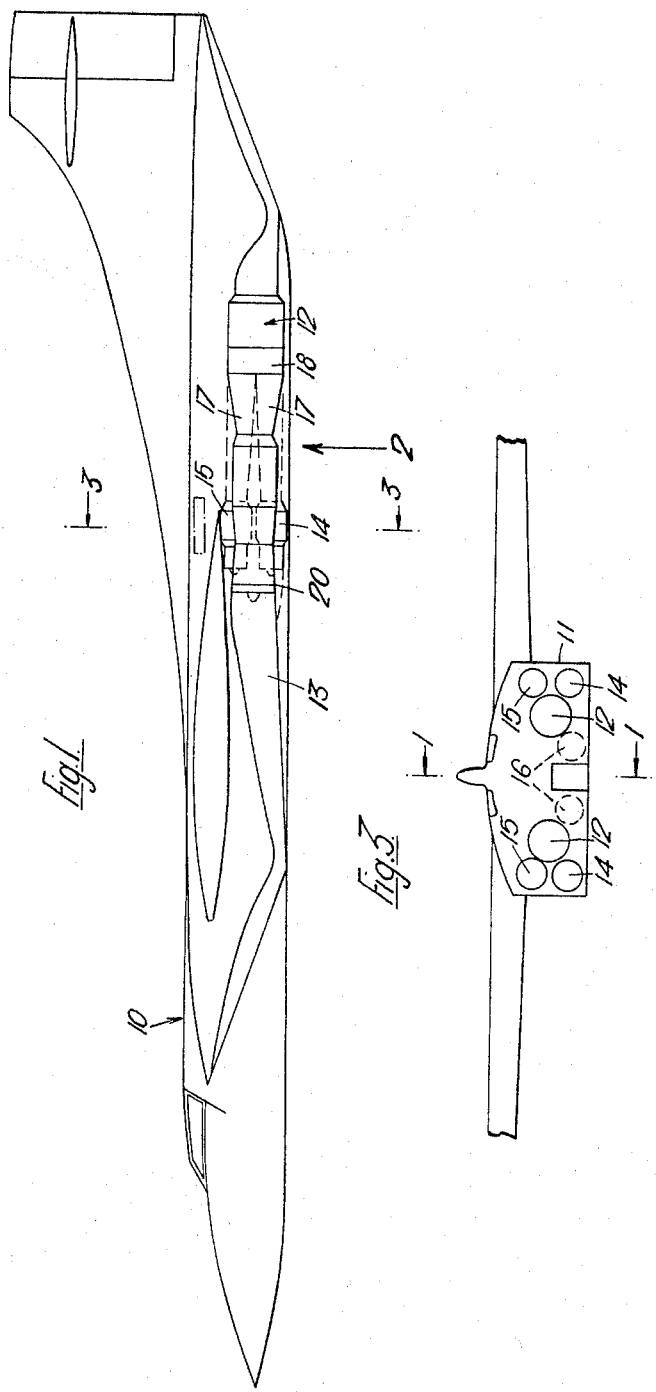

3,279,191
GAS TURBINE POWER PLANT
John Gregory Keenan, Derby, Jack Palfreyman, Tansley, and John Bertram Holliday, Derby, England, assignors to Rolls-Royce Limited, Derby, England, a company of Great Britain
Filed Dec. 6, 1963, Ser. No. 328,660
Claims priority, application Great Britain, Dec. 17, 1962, 47,630/62
4 Claims. (Cl. 60—263)

The invention concerns gas turbine power plant.

According to the present invention, there is provided gas turbine power plant comprising a main gas turbine engine, a main intake which is arranged to supply the main gas turbine engine with air and which is adapted for use at supersonic speeds, one or more auxiliary gas turbine engines, means for directing the exhaust gases of the or each auxiliary engine into the exhaust duct of the main engine, at least one conduit which is arranged to supply the auxiliary engine or engines with air and which communicates with the main air intake, and valve means for controlling the air flow through said conduit or conduits, said valve means being adapted to be opened and closed so as respectively to permit and prevent the flow of air from the main air intake and through the conduit or conduits to the auxiliary engine.

It will be appreciated that the main air intake and the main engine exhaust duct must be designed for the large quantities of gases which pass through the power plant when the latter is operated at high speeds and that, in consequence, such quantities may be much in excess of those required at lower speeds.

When, however, a gas turbine power plant according to the present invention is being operated at such lower speeds, the said valve means may be opened. When this is done, the amount of air supplied to the main engine will be reduced, while the exhaust gases of the auxiliary engine or engines will be supplied to the exhaust duct of the main engine and will therefore prevent over-expansion therein of the exhaust gases of the main engine.

The said conduit or conduits may also communicate with the exhaust duct of the main engine so that any air passing through said conduit or conduits, which is not consumed by the auxiliary engine or engines is fed to the exhaust duct of the main engine.

The or each auxiliary engine may be adapted to be moved between an horizontal position, in which the said exhaust gases are directed into the exhaust duct of the main engine, and a vertical or downwardly inclined position in which the said exhaust gases are downwardly directed.

The main engine may be adapted to be used, as required, either as a gas turbine or as a ram-jet engine. Such an arrangement is advantageous by reason of the fact that when a gas turbine engine is used at high supersonic speeds, the outlet from the low pressure compressor of the engine tends to become choked.

The main engine may therefore, if desired, be provided with a main flow duct and with additional duct means; the main flow duct being provided in flow series with compressor means, primary combustion equipment, turbine means, reheat combustion equipment, and an exhaust passage; and the additional duct means communicating with the main air intake so as to be adapted to receive ram air therefrom and, after by-passing the compressor means, primary combustion equipment, and turbine means, being arranged to supply air to the reheat combustion equipment; at least some of the air passing through the additional duct means being passed to the auxiliary engine or engines and any air passing through said duct means which is not consumed by the auxiliary engine or engines being fed to the exhaust duct of the main engine.

There may be a plurality of auxiliary engines each of which has a respective said conduit whose air is supplied from the main air intake through a valve means, the exhaust gases of all the auxiliary engines being directed into the exhaust duct of the main engine.

The valve means is preferably constituted by at least one pivoted door.

Figure 2:
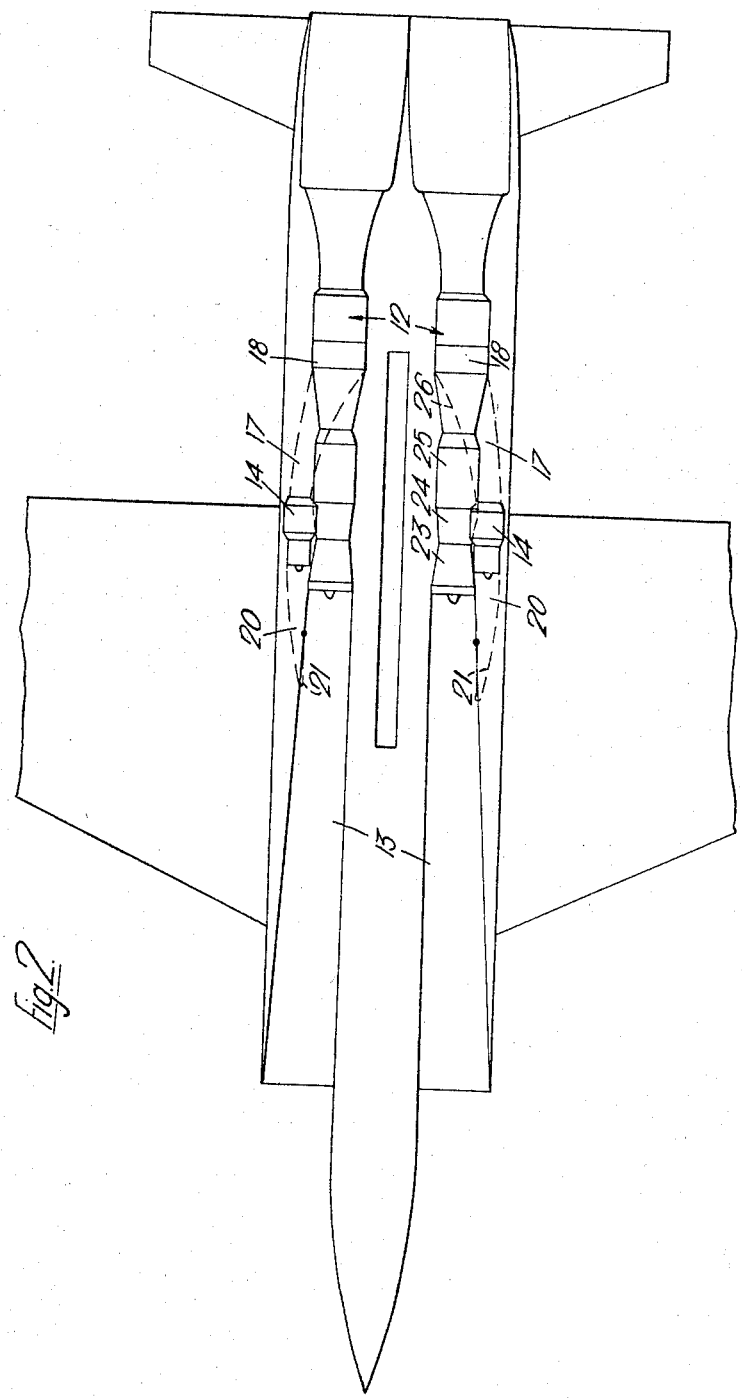

The invention is illustrated, merely by way of example, in the accompanying drawings, in which:

FIGURE 1 is a diagrammatic sectional side view (taken on the line 1—1 of FIGURE 3) of a supersonic aircraft provided with gas turbine power plant according to the present invention, FIGURE 2 is a diagrammatic underneath plan view taken in the direction of the arrow 2 of FIGURE 1, and FIGURE 3 is a diagrammatic cross section taken on the line 3—3 of FIGURE 1.

Referring to the drawings, a supersonic aircraft 10 has a fuselage 11 on either side of whose longitudinal axis there is mounted a main, forward propulsion, gas turbine engine 12.

A main air intake 13 is provided for the supply of air to each of the main engines 12, each main air intake 13 being adapted for use at supersonic speeds.

Each of the main engines 12 has two auxiliary engines 14, 15 associated with it. The two auxiliary engines 14, 15 of each pair may be disposed horizontally and to one side of the respective main engine 12, the engines 14, 15 of each pair being arranged one above the other.

Alternatively, the upper engine 15 of each pair of auxiliary engines may be replaced by an auxiliary engine 16 which is disposed on the side of the respective main engine 12 remote from the respective auxiliary engine 14. In this case, the auxiliary engine 16 may be arranged to be moved between an horizontal position and a vertical, or downwardly inclined, position in which its exhaust gases are downwardly directed so as to provide vertical lift forces.

The exhaust gases from the auxiliary engines 14, 15 (or from the auxiliary engines 14, 16 when the latter are horizontally disposed) are directed through auxiliary exhaust ducts 17 into the main exhaust duct 18 of the respective main engine 12.

Each of the auxiliary engines is supplied with air through a conduit 20 which communicates with the respective main air intake 13 by way of a valve device constituted by a pivoted door 21. The pivoted door 21 is adapted to be moved (by means not shown) between open and closed positions so as respectively to permit and prevent the flow of air from each main air intake 13 to the conduit 20.

At high supersonic speeds, the doors 21 are maintained closed, the auxiliary engines are not used, and all the air passing through the main air intakes 13 passes to the main engines 12.

At lower speeds, however, the doors 21 are maintained open, the auxiliary engines are brought into operation, and the air supplied to the auxiliary engines decreases the excess of air supplied to the main engines 12. The exhaust gases from the auxiliary engines are supplied to the main exhaust ducts 18 and therefore prevent the over-expansion therein of the main engines' own exhaust gases.

The main engines 12 may conveniently be such as to be usable at will either as gas turbine engines or as ram jet engines. Such engines are disclosed in our co-pending United States patent applications Nos. 328,659 and 328,661, both filed on December 6, 1963.

Thus each main engine may be provided with a flow duct in which are arranged in flow series one or more compressors 23, primary combustion equipment 24, one or more turbines 25, and reheat combustion equipment 26; each main engine also having additional duct means (not shown) which, directly or indirectly, communicate with the main air intake 13 so as to receive ram air therefrom, and which, after by-passing the compressors 23, primary combustion equipment 24, and turbines 25, are arranged to supply air to the reheat combustion equipment 26.

In this case, the conduit 20 of each auxiliary engine may, instead of communicating directly with the main air intake 13, be arranged to receive at least some of the air passing through the said additional duct means.

The conduits 20 may extend past the respective auxiliary engines and may communicate at their downstream ends with the main exhaust duct 18 so that any air within the conduits 20 which is not consumed by the auxiliary engines is fed into the main exhaust duct 18.

We claim:
1. Gas turbine power plant comprising a main gas turbine engine operative at subsonic and supersonic speeds, said engine having an exhaust duct, a main air intake which is arranged to supply the main gas turbine engine with air and which is adapted for use at supersonic speeds, a plurality of auxiliary gas turbine engines operative at subsonic speeds, means for directing the exhaust gases of all the auxiliary engines into the exhaust duct of the main engine, respective conduits which are respectively arranged to supply the auxiliary engines with air and which communicate with the main air intake, and respective valve means for controlling the air flow through each said conduit, said valve means being adapted to be opened and closed so as respectively to permit and prevent the flow of air from the main air intake and through the respective conduits to the respective auxiliary engines.

2. An aircraft provided with gas turbine power plant comprising a main gas turbine engine operative at subsonic and supersonic speeds, said engine having an exhaust duct, a main air intake which is arranged to supply the main gas turbine engine with air and which is adapted for use at supersonic speeds, a plurality of auxiliary gas turbine engines, means for directing the exhaust gases of all the auxiliary engines into the exhaust duct of the main engine, respective conduits which are respectively arranged to supply the respective auxiliary engines with air and which communicate with the main air intake, the said conduits also communicating with the exhaust duct of the main engine so that any air passing through said conduits which is not consumed by the auxiliary engines is fed to the exhaust duct of the main engine, and respective pivoted doors for controlling the air flow through said conduits, said doors being adapted to be opened and closed so as respectively to permit and prevent the flow of air from the main air intake and through the respective conduits to the respective auxiliary engines.

3. Gas turbine power plant, as claimed in claim 1, in which the said conduits also communicate with the exhaust duct of the main engine so that any air passing through said conduits which is not consumed by the auxiliary engines is fed to the exhaust duct of the main engine.

4. Gas turbine power plant as claimed in claim 1 wherein each respective valve means comprise at least one pivoted door for controlling the air flow through the respective said conduit.

References Cited by the Examiner
UNITED STATES PATENTS

| | | | |
|---|---|---|---|
| 2,982,495 | 5/1961 | Griffith | 244—58 X |
| 3,149,461 | 9/1964 | Eichholtz | 60—35.6 |
| 3,153,904 | 10/1964 | Ellis et al. | 60—35.6 X |
| 3,161,018 | 12/1964 | Sandre | 60—35.6 |
| 3,199,291 | 8/1965 | Kelley et al. | 60—35.6 X |

MARK NEWMAN, *Primary Examiner.*

D. HART, *Assistant Examiner.*